(12) United States Patent
Biswal et al.

(10) Patent No.: US 9,188,449 B2
(45) Date of Patent: Nov. 17, 2015

(54) CONTROLLING IN-VEHICLE COMPUTING SYSTEM BASED ON CONTEXTUAL DATA

(71) Applicant: Harman International Industries, Incorporated, Stamford, CT (US)

(72) Inventors: Rajesh Biswal, Bangalore (IN); Debashis Mukherjee, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 21 days.

(21) Appl. No.: 14/099,727

(22) Filed: Dec. 6, 2013

(65) Prior Publication Data

US 2015/0160019 A1    Jun. 11, 2015

(51) Int. Cl.
*B60W 50/00* (2006.01)
*G01C 21/26* (2006.01)

(52) U.S. Cl.
CPC .............. *G01C 21/26* (2013.01); *B60W 50/00* (2013.01)

(58) Field of Classification Search
CPC ........... B60R 16/0231; B60R 16/0315; B60G 17/0195; B60T 8/172; G07C 5/008; G01C 21/26; B60W 50/00
USPC .............................................................. 701/1
See application file for complete search history.

(56) References Cited

U.S. PATENT DOCUMENTS

| | | | |
|---|---|---|---|
| 7,535,344 B2* | 5/2009 | Obradovich | 340/426.33 |
| 8,634,822 B2* | 1/2014 | Silver et al. | 455/420 |
| 2002/0091473 A1* | 7/2002 | Gardner et al. | 701/35 |
| 2002/0116156 A1* | 8/2002 | Remboski et al. | 702/188 |
| 2002/0120371 A1* | 8/2002 | Leivian et al. | 701/1 |
| 2008/0154438 A1* | 6/2008 | Kalik | 701/1 |
| 2010/0256852 A1* | 10/2010 | Mudalige | 701/24 |
| 2012/0284593 A1* | 11/2012 | Rodriguez | 715/201 |
| 2012/0289788 A1* | 11/2012 | Jain et al. | 600/301 |
| 2012/0289789 A1* | 11/2012 | Jain et al. | 600/301 |
| 2012/0289791 A1* | 11/2012 | Jain et al. | 600/301 |
| 2012/0290950 A1* | 11/2012 | Rapaport et al. | 715/753 |
| 2012/0303203 A1* | 11/2012 | Olsen et al. | 701/29.1 |
| 2012/0304265 A1* | 11/2012 | Richter et al. | 726/7 |
| 2013/0150004 A1* | 6/2013 | Rosen | 455/414.1 |
| 2013/0204493 A1* | 8/2013 | Ricci et al. | 701/41 |
| 2013/0226369 A1* | 8/2013 | Yorio et al. | 701/1 |
| 2014/0309849 A1* | 10/2014 | Ricci | 701/33.4 |
| 2014/0335902 A1* | 11/2014 | Guba et al. | 455/456.4 |

* cited by examiner

*Primary Examiner* — Mary Cheung
*Assistant Examiner* — Atul Trivedi
(74) *Attorney, Agent, or Firm* — Alleman Hall McCoy Russell & Tuttle LLP

(57) ABSTRACT

Embodiments are disclosed for systems and methods for controlling operation of an in-vehicle computing system. In some embodiments, an in-vehicle computing system includes a processor, an external device interface communicatively coupleable to an extra-vehicle server, and a storage device storing instructions executable by the processor to receive information from a navigation subsystem and one or more sensors of the vehicle. The information may include user information identifying one or more occupants of the vehicle with one or more accounts of a social media network. The instructions may also be executable to send the received information to the server, receive instructions from the server, and transmit control instructions to one or more vehicle systems based on the identified action. The instructions may identify an action to be performed based on the received information.

19 Claims, 9 Drawing Sheets

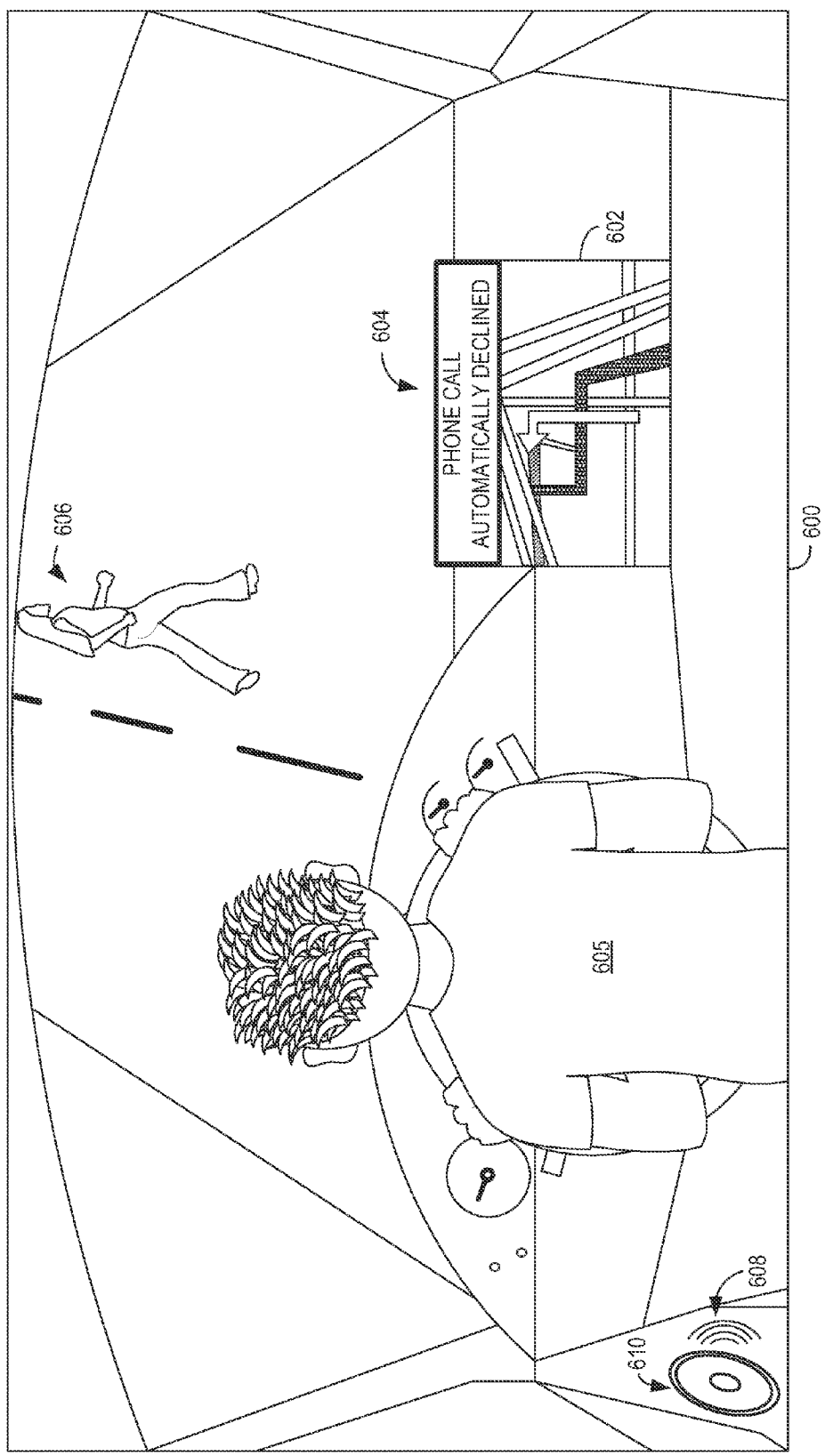

CONTROLLING IN-VEHICLE COMPUTING SYSTEM BASED ON CONTEXTUAL DATA

FIELD

The disclosure relates to an in-vehicle computing system and associated controls based on combining contextual data from multiple data sources.

BACKGROUND

A user experience within a vehicle may be generated and/or augmented by an in-vehicle computing system configured to control one or more systems within the vehicle. For example, the in-vehicle computing system may present media, navigational assistance, and/or other information to occupants of the vehicle via a speaker system and/or one or more display systems. Often, in-vehicle computing system operation is controlled based on user input. Vehicles may be equipped with a wide array of sensors for monitoring vehicle status, driver and/or passenger behavior, vehicle environment, and other data. The in-vehicle computing system may be in communication with one or more of the vehicle sensors during operation.

The increasing popularity of social media networks and other account-based web services has resulted in an accumulation of a vast array of knowledge regarding behaviors, preferences, demographics, and other information for a user. Such information may provide insight into a status of the user and other contextual information associated with the user.

SUMMARY

Embodiments are disclosed for in-vehicle computing systems and methods of controlling vehicle systems based on contextual information. In example embodiments, an in-vehicle computing system includes a processor, an external device interface communicatively coupleable to an extra-vehicle server, and a storage device storing instructions executable by the processor to receive information from a navigation subsystem and one or more sensors of the vehicle. The information may include user information identifying one or more occupants of the vehicle with one or more accounts of a social media network. The instructions may also be executable to send the received information to the server, receive instructions from the server, and transmit control instructions to one or more vehicle systems based on the identified action. The instructions may identify an action to be performed based on the received information.

In some embodiments, a system for controlling an output of an in-vehicle computing system of a vehicle may include a data integration subsystem that receives data from the in-vehicle computing system and a content aggregator, an analytics engine that analyzes the received data, and a data persistence subsystem that manages analytics results from the analytics engine. The system may further include a rules engine that invokes rules responsive to an occurrence of one or more events based on analysis of the received data by the analytics engine, the rules defining an instruction to control the output of the in-vehicle computing system. The system may further include a service application programming interface (API) that can be used by application developers to provide information on the action to be performed by the in-vehicle computing system to the driver and/or passenger so that the action can be modified and/or customized based on user inputs.

In some embodiments, a method for controlling an output of an in-vehicle computing system of a vehicle may include receiving, at a server, navigational information from a navigation system of the vehicle, receiving, at the server, aggregated information from one or more user accounts associated with a driver of the vehicle, and determining a cognitive load of the driver of the vehicle based on the navigational information and the aggregated information. The method may further include, responsive to determining that the cognitive load of the driver is above a threshold, transmitting an instruction to the in-vehicle computing system to prevent an increase in cognitive load and/or decrease a cognitive load on the driver in accordance with a rule set.

BRIEF DESCRIPTION OF THE DRAWINGS

The disclosure may be better understood from reading the following description of non-limiting embodiments, with reference to the attached drawings, wherein below:

FIG. 6 shows an example in-vehicle computing system output for maintaining and/or reducing cognitive load of a driver of a vehicle, in accordance with one or more embodiments of the present disclosure.

DETAILED DESCRIPTION

In-vehicle computing systems may be connected to various information sources (e.g., sensors, devices, etc.) in order to combine and analyze data from these sources within a context of the vehicle status, vehicle environment, driver information, and/or other real-time contextual events or conditions. The real-time contextual data may be leveraged during in-vehicle computing system operation to provide a user experience that is at once adaptive and rules driven. By adjusting in-vehicle computing system behavior responsive to a context of the vehicle/driver that is derived from a plurality of information sources, the in-vehicle computing system may provide more autonomous and accurate operation than in-vehicle computing systems that rely primarily on user input and a more limited amount of data gathering. Using the data collected by the in-vehicle computing system, the system may select vehicle settings (e.g., climate control settings, audio system settings, etc.), provide targeted output (e.g., display relevant information, communicate with and/or control other devices, etc.), and/or perform other actions that enhance the user experience.

Figure 1:
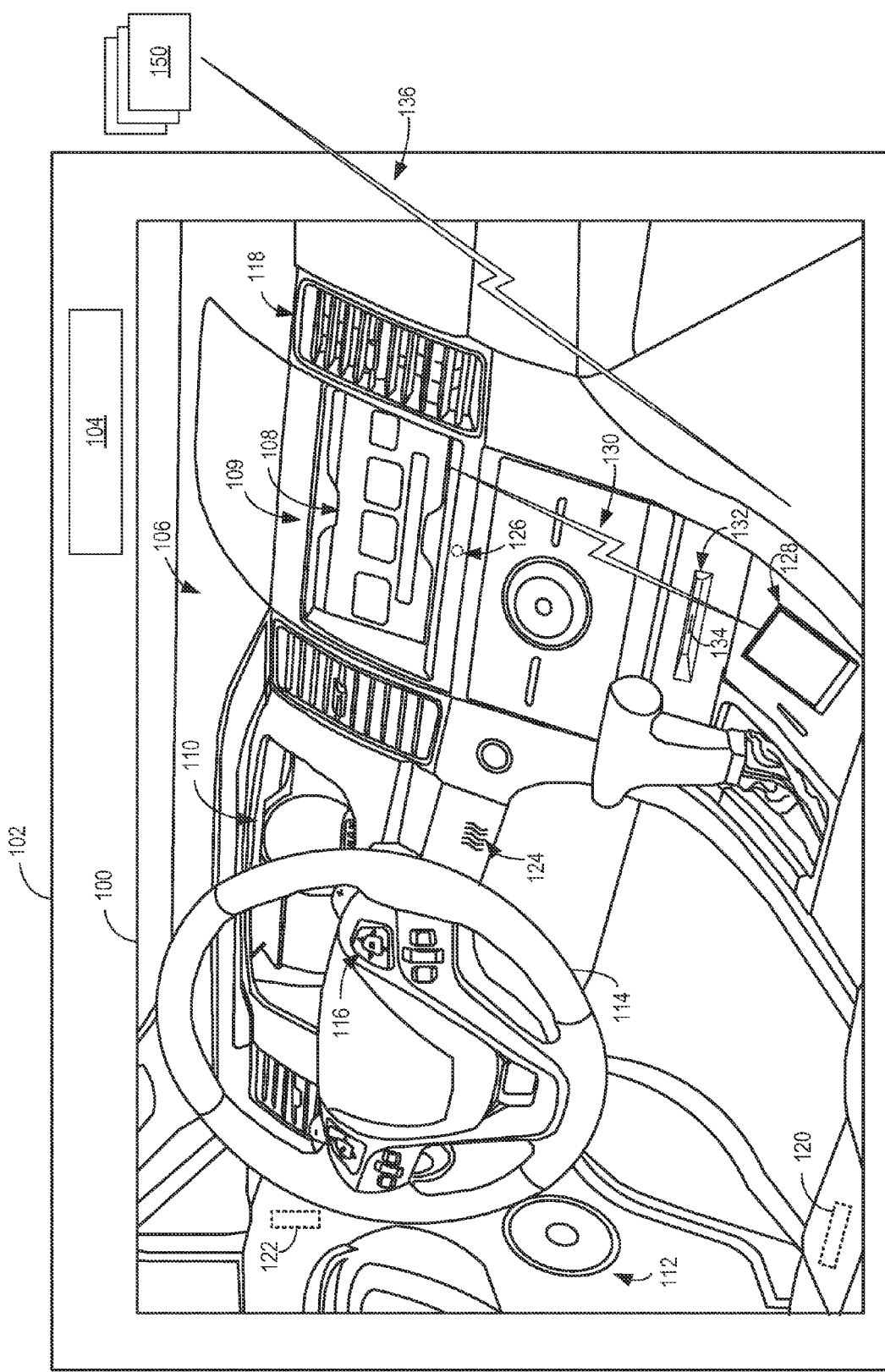
FIG. 1 is a partial view of a vehicle cabin including an in-vehicle computing system communicatively coupled to a mobile device and a wearable device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
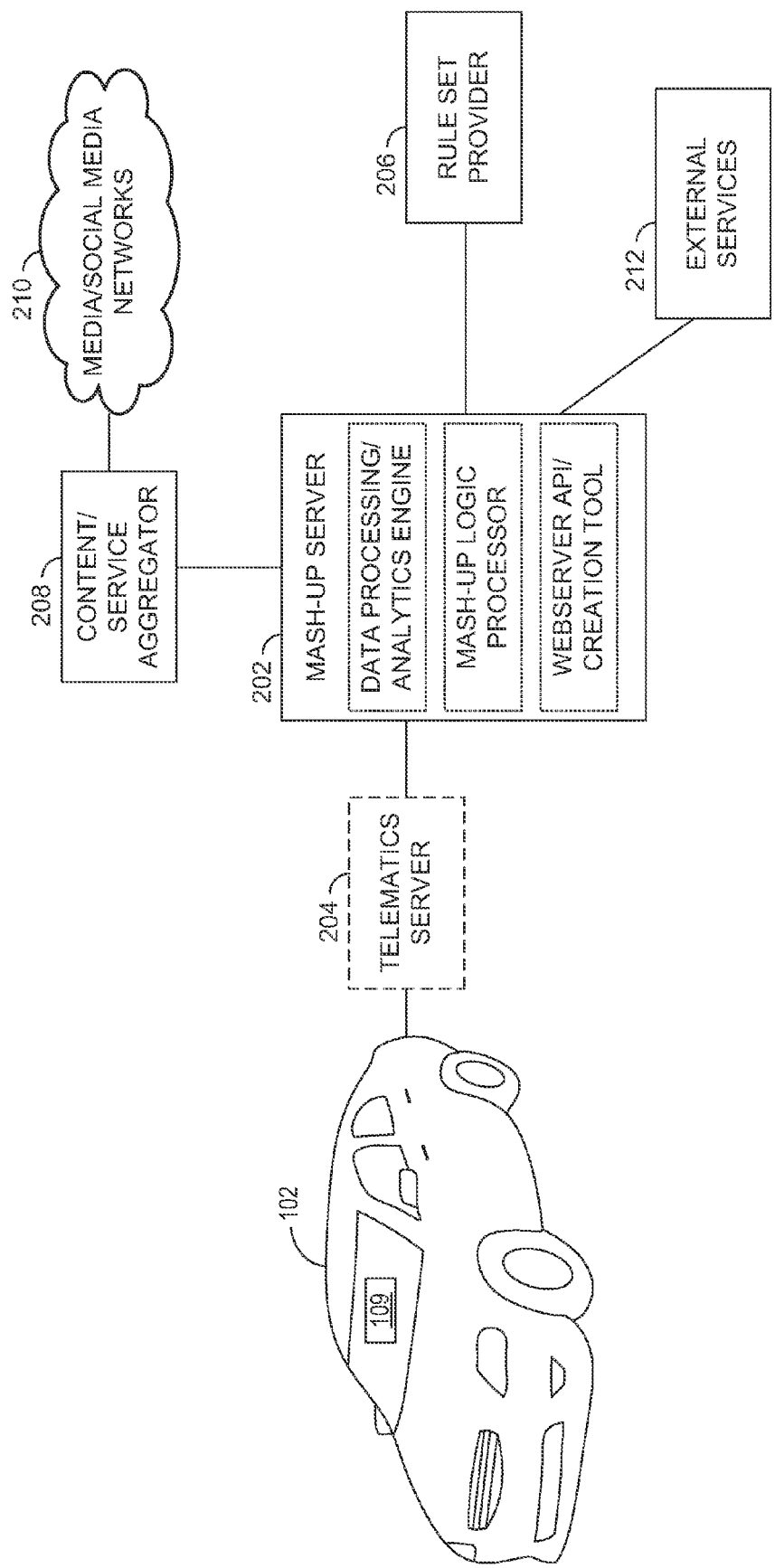
FIG. 2 shows a schematic representation of an in-vehicle computing system in communication with a plurality of external devices, in accordance with one or more embodiments of the present disclosure.

FIG. 2 shows a schematic representation of the in-vehicle computing system 109 of FIG. 1 in communication with a plurality of external devices. The in-vehicle computing system 109 may be connected to a mash-up server 202 via a telematics server 204. For example, the telematics server 204 may receive and interpret wireless communications including vehicle status data (e.g., Global Positioning Satellite [GPS] data, vehicle sensor data, driver/passenger data, etc.) from the vehicle 102 for automated roadside assistance, remote diagnostics, and/or other third party services. The in-vehicle computing system 109 may communicate with the telematics server 204 via any suitable wireless communications protocol, as described above with respect to communication links 130/136. When included, the telematics server 204 may pass all or a portion of the data received from the in-vehicle computing system 109 to the mash-up server 202. The mash-up server 202 may be configured to receive data from the in-vehicle computing system 109 (e.g., the vehicle status data described above) and analyze the data within the context of information received from other external services and rules set by a provider to determine a course of action based on the data. In this way, the mash-up server 202 may "mash-up" information from the multiple services in order to determine the presence of an event that triggers a particular action. For example, the action may be identified based on a context of one or more occupants of the vehicle derived from information received at the server from a social media network (e.g., a user profile of the social media network associated with the one or more occupants). Upon determining such an event, the mash-up server 202 may then transmit (e.g., to the in-vehicle computing system 109) an instruction to perform the action.

The mash-up server 202 may include a data processing/analytics engine and mash-up logic processor to store and/or interpret data from different sources in light of rules provided by a rule set provider 206. For example, the rule set provider 206 may utilize a rule set creation tool defined by and/or in association with a webserver application programming interface (API) hosted by the mash-up server 202. The creation tool may enable the rule set provider to define relationships between data from the vehicle and/or external services and one or more actions. The rule set provider 206 may include the driver or other user of the in-vehicle computing system, a manufacturer of the vehicle and/or in-vehicle computing system, an application developer, and/or any other third party.

The mash-up server may receive information from a content service aggregator 208, which aggregates information from various media and/or social media networks 210. For example, the content service aggregator 208 may receive and/or access information associated with user accounts for one or more internet-based services (e.g., social media networks, audio/video subscription services, consumer services, etc.). The content service aggregator 208 may provide and communicate with the mash-up server 202 via a webservices API (e.g., a Representational State Transfer [REST] based API) to transmit the aggregated content and/or service information to the mash-up server. For example, the content service aggregator 208 may send information related to one or more user calendars, mail accounts, social media feeds, etc. The content service aggregator 208 may also receive information from the mash-up server in order to provide information based on the data received from the in-vehicle computing system 109. In some embodiments, the mash-up server 202 may send navigation data, user input, and/or other information to target or otherwise request related information in the content service aggregator 208. For example, the mash-up server may send information related to a location of the vehicle and the content service aggregator may locate information from the various media/social media networks to identify and send relevant data for points of interest near the location of the vehicle to the mash-up server. Accordingly, the mash-up server may provide suggestions and/or make decisions regarding the points of interest based on reviews or opinions published by the user and/or friends of the user.

The mash-up server 202 may also receive information directly from other external services 212, such as search tools, map providers, etc. Using the point of interest example provided above, the mash-up server 202 may perform a search via one or more of the external services 212 to identify points of interest and send the points of interest to the content service aggregator 208 to request information related to the identified points of interest. It is to be understood that the scenarios described herein are exemplary, and information may be received/requested from any number of sources in any suitable order. For example, the mash-up server may receive information from the content service aggregator and one or more external services substantially simultaneously or utilize information received by one or more of the content service aggregator and the external services to request information from the content service aggregator and/or external services. In some embodiments, the mash-up server may continually receive information from one or more sources and/or from the in-vehicle computing system 109 in order to monitor for an event defined by the rule set provider 206. Received data may be stored on a storage device located in or communicatively connected to the mash-up server 202 in order to monitor the data over time.

Figure 3:
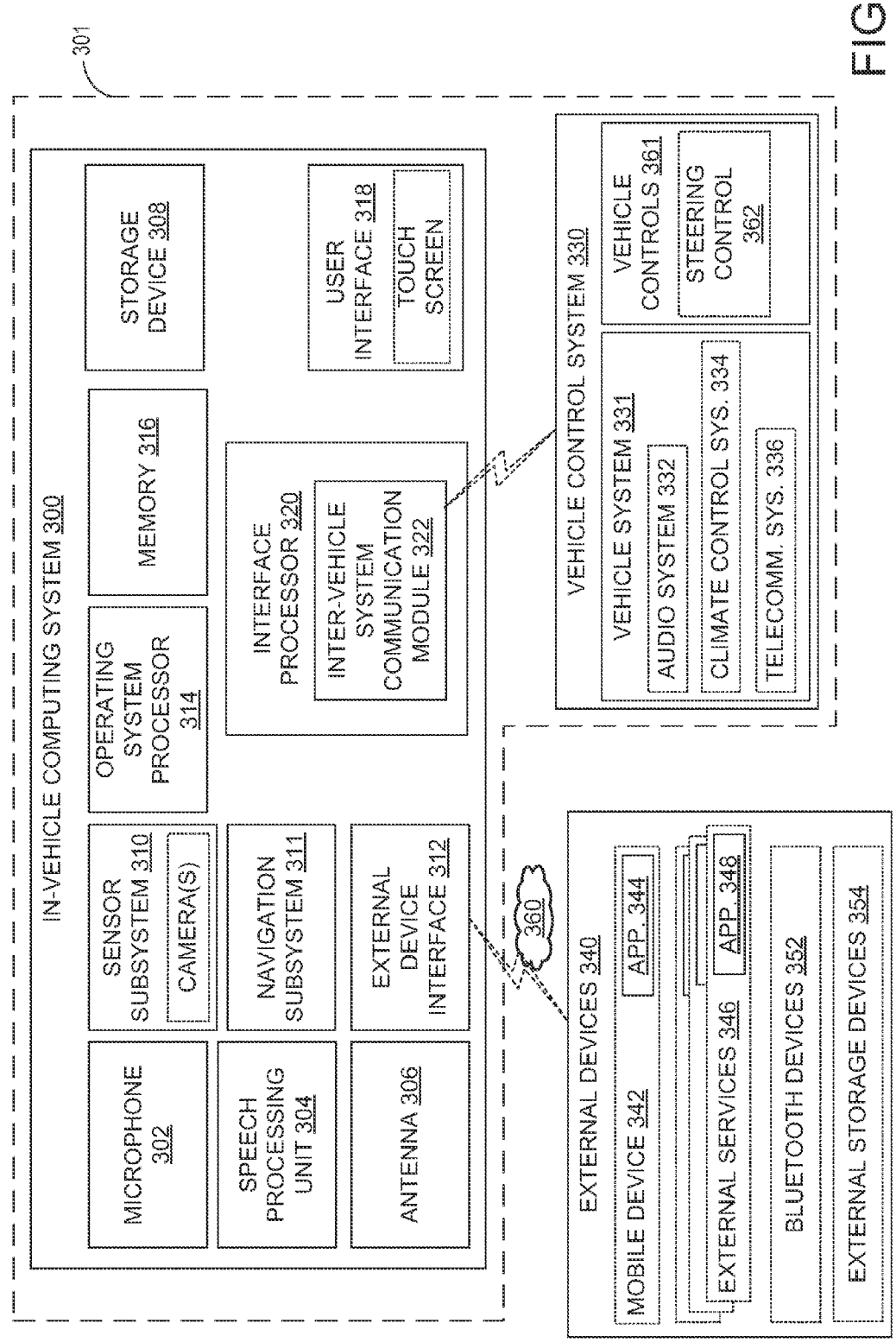
FIG. 3 shows a block diagram of an in-vehicle computing system, in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIGS. 1 and 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, subsystems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to and/or pairing with a mobile device and/or a wearable device. The application may then retrieve user information gathered by the mobile device and the wearable device. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user and/or to measure ambient noise in the vehicle, and a speech processing unit 304 may process the received voice commands. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle. Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346, such as mash-up server 202 and telematics server 204 of FIG. 2. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context and a pre-defined rule set. An example method of determining an action to be performed by an in-vehicle computing system is discussed with reference to FIGS. 5A-5C.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages, as well as navigational assistance, may be displayed to the user on a display of the user interface. As elaborated below with respect to FIGS. 5A-5C, confirmation of actions performed in response to an event (e.g., based on a rule set) may be performed via user input to the user interface.

Figure 4:
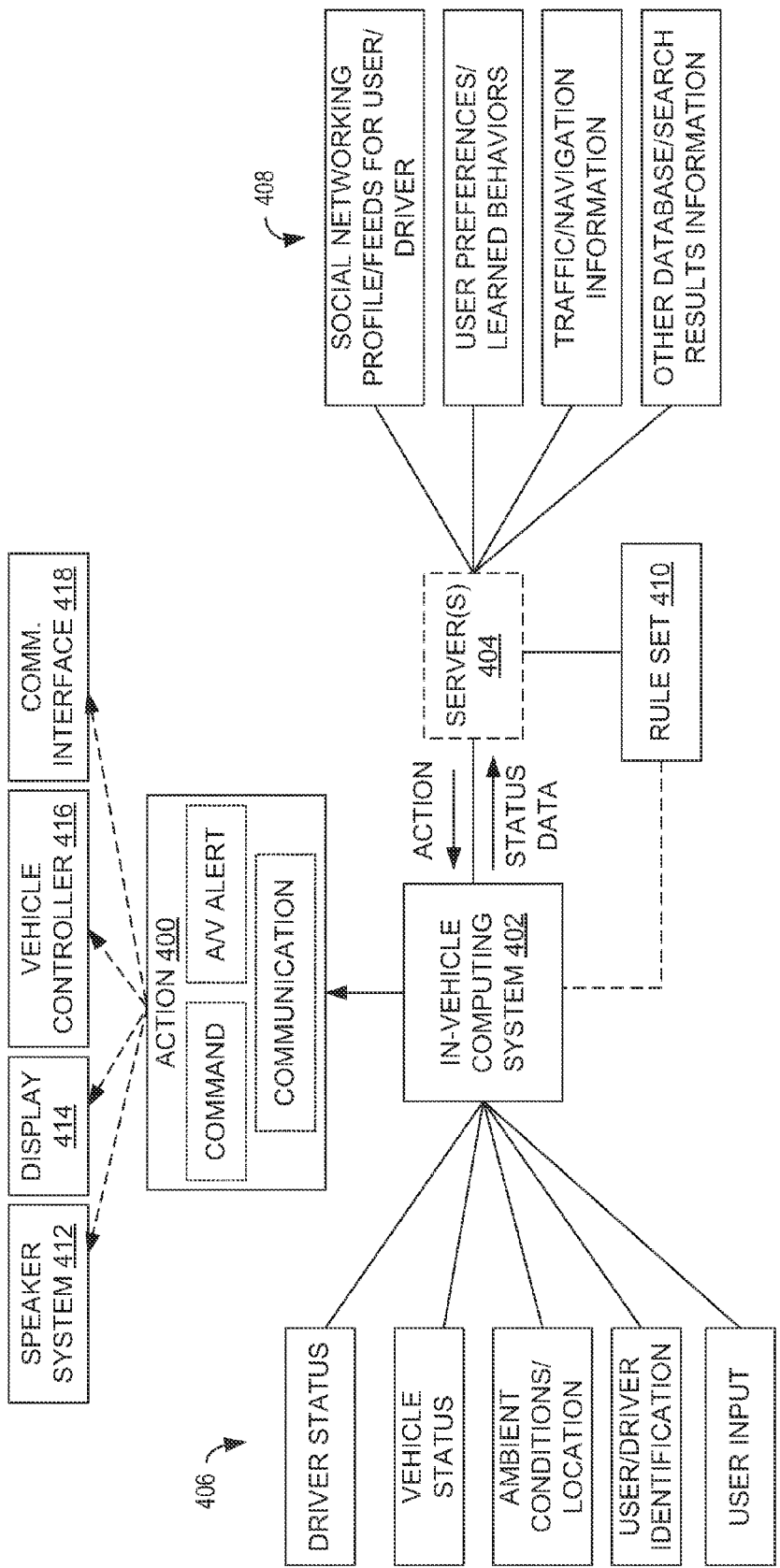
FIG. 4 schematically shows exemplary actions that may be performed based on data received at an in-vehicle computing system and/or one or more server(s), in accordance with one or more embodiments of the present disclosure.

FIG. 4 schematically shows exemplary actions 400 that may be performed and/or instructed by an in-vehicle computing system 402 based on one or more types of data received at the in-vehicle computing system 402 and/or one or more server(s) 404. Examples of driver/vehicle status information 406 received and/or generated at the in-vehicle computing system 402 include but are not limited to driver status (e.g., cognitive load, level of fatigue, mood, etc.), vehicle status (e.g., operational mode/conditions/state), ambient conditions/location of the vehicle (e.g., navigation information, information from vehicle cameras/microphones, etc.), user/driver identification, and user input. For example, contextual information that includes or is defined by real-time data may be evaluated in the in-vehicle computing system 402 to determine an action to be performed. Examples of extended contextual information 408 received at one or more server(s) 405 include but are not limited to social networking profile and/or feed data for a user and/or driver, user preferences and/or learned user behaviors, traffic/navigation information, and/or other information from databases and/or search results. In this way, the evaluation of events and determinations of actions to be performed and/or instructed by the in-vehicle computing system may be performed by the in-vehicle computing system 402 and/or the server(s) 405 (e.g., based upon the type of event or events being evaluated).

The server(s) 404 and/or the in-vehicle computing system 402 may access one or more rule sets 410 defining a connection between a detected event and one or more actions. The event may be detected based on the data received at the in-vehicle computing system 402 and/or servers 404. Upon detection of the event, an action may be triggered. In some embodiments, the action may include an instruction for the server(s) and/or in-vehicle computing system to request more data (e.g., driver/vehicle status information 406 and/or extended contextual information 408). The action may additionally or alternatively include operations to be performed by the in-vehicle computing system 402. For example, the in-vehicle computing system may receive an instruction from the server(s) 404 identifying the action to be taken. As illustrated, the action 400 may include a command (e.g., a command to control functionality of a vehicle system), an audio and/or video alert (e.g., a message or notification), and/or a communication (e.g., an instruction to send a message and/or data to another system).

The action 400 may be provided to one or more of a speaker system 412 (e.g., when the action includes an audible alert), a display device 414 (e.g., when the action includes a visual alert, a vehicle controller 416 (e.g., when the action includes an instruction to alter operation of a vehicle system), and a communications interface 418 (e.g., when the action includes an instruction to acquire further information from an external device, establish a phone call with an external device, and/or otherwise establish communications with another device/system). For example, the vehicle controller 416 may be a controller communicatively connected to a CAN bus of the vehicle (e.g., vehicle control system 330 of FIG. 3), and the command may instruct the vehicle controller to alter operation of a vehicle system (e.g., adjust engine operating conditions, adjust a climate control system, etc.). It is to be understood that the action 400 may include any suitable command and/or combination of commands and any number/combination of output devices may receive instructions from the in-vehicle computing system 402 to perform the action.

Figure 5A:
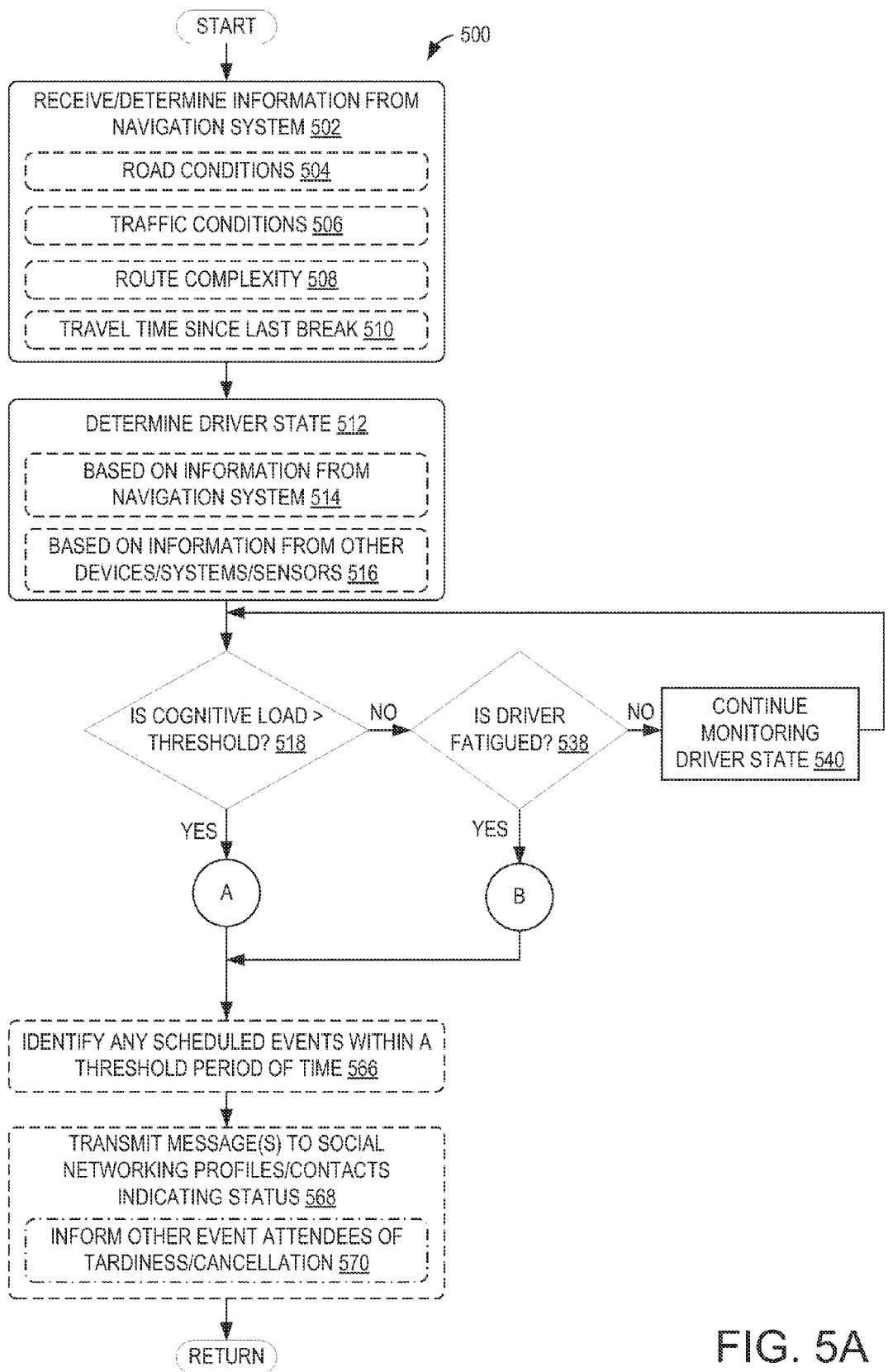
FIGS. 5A-C are a flow chart of a method of controlling an output of an in-vehicle computing system based on information from multiple data sources, in accordance with one or more embodiments of the present disclosure.
Figure 5B:
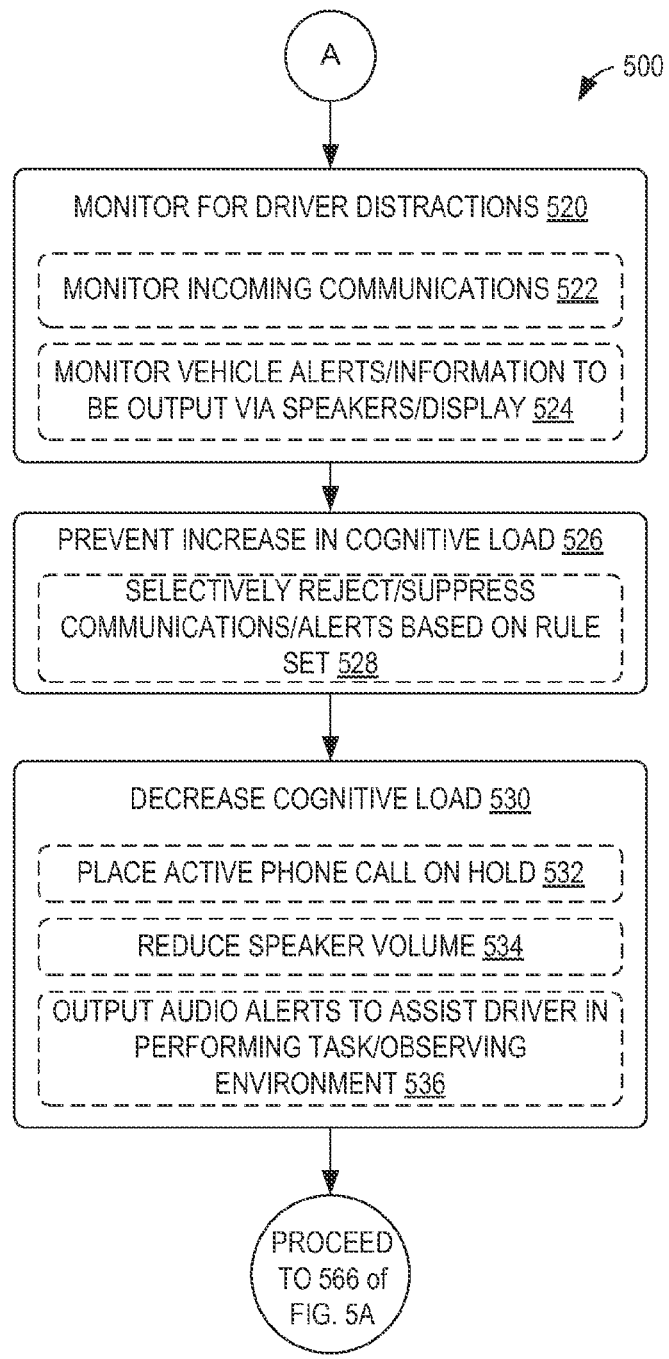
Figure 5C:
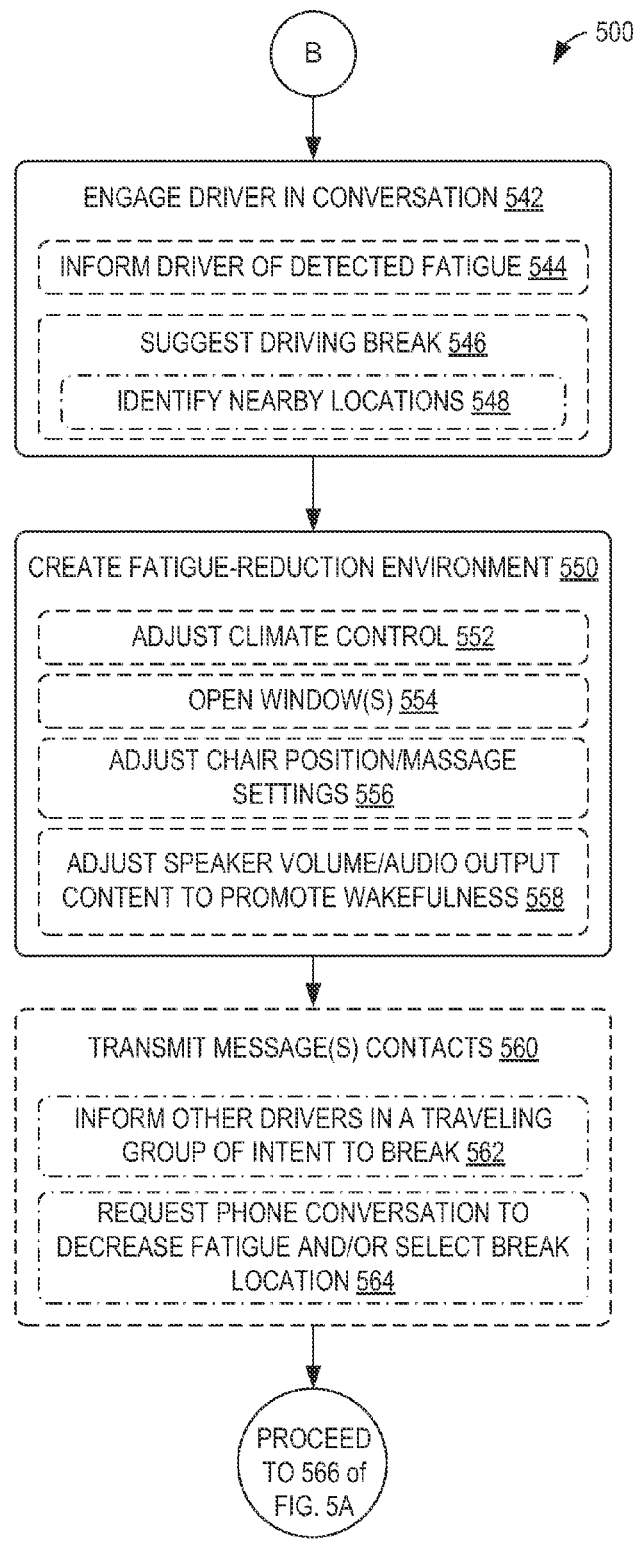

FIGS. 5A-5C show flow charts for an example method 500 for controlling an output of an in-vehicle computing system (e.g., in-vehicle computing system 109 of FIG. 1) based on information from multiple data sources. At 502, the method 500 includes receiving and/or determining information from a navigation system. For example, the information may include road conditions, traffic conditions, route complexity, and/or an identification of an amount of travel time since the last break taken by the driver, as indicated at 504, 506, 508, and 510, respectively. The navigation system information may be determined by the navigation system of the vehicle and/or determined by a server and sent to the in-vehicle computing system as described above.

At 512, the method 500 includes determining a driver state. As indicated at 514, the driver state may be indicated by information from the navigation system. For example, information regarding a complexity of an upcoming maneuver (e.g., a difficult intersection with multiple lanes and/or unusual traffic patterns), an amount of traffic in the vicinity of the driver, a distance/time since the driver last stopped/turned off the vehicle, and/or other indicators of the driver state may be determined based on information tracked/provided by the navigation system. As indicated at 516, the driver state may be determined based on information from other devices, systems, and/or sensors aside from the navigation system. For example, driver state may be gleaned from phone calls received by the driver, information from vehicle sensors (e.g., detection of unusual operating states, frequent gear/acceleration changes, cruise control actuation, defrost actuation and/or humidity levels in the vehicle, ambient noise/recognized speech, image data from one or more cameras imaging the vehicle cabin/environment, etc.), and/or any other suitable indicator of the mental or physical state of the driver.

The method 500 includes determining if a cognitive load of the driver (e.g., based on the driver state determined at 512) is greater than a cognitive load threshold, as indicated at 518. The cognitive load threshold may be predetermined and/or customized for the particular driver based on historical data. For example, the cognitive load and associated threshold may be defined as a number of distractions for a driver (e.g., assistance from a navigational system, phone calls, audio output, detected ambient noise indicating a conversation with a passenger, inclement weather, etc.), a total intensity of distractions (e.g., an intensity level of each distraction may be determined and aggregated to define the total intensity), and/or any other suitable attribute for defining cognitive load and an associated cognitive load threshold. The evaluation of the cognitive load of the driver may be performed by the in-vehicle computing system, the mash-up server, and/or any combination of computing systems. For example, since navigation data may include real-time information, the in-vehicle computing system may determine the cognitive load of the driver based on information generated by the navigational system within the in-vehicle computing system. The in-vehicle computing system may store and/or generate data such as the cognitive load threshold or receive the cognitive load threshold from the mash-up server (e.g., in response to sending a request for the threshold data). Accordingly, the in-vehicle computing system may compare the determined cognitive load of the driver to the generated or received cognitive load threshold at 512.

If the cognitive load is greater than the threshold (e.g., "YES" at 518), the method 500 proceeds to 520 to monitor for driver distractions, as illustrated in FIG. 5B. Monitoring for driver distractions may include monitoring incoming communications, as indicated at 522. For example, receiving a phone call, text message, or other communication may distract the driver from performing driving-related tasks, which may be dangerous when the cognitive load of the driver is already higher than a threshold.

Monitoring for driver distractions may also include monitoring vehicle alerts/information that is requesting to be output via vehicle speakers, display, and/or other output device, as indicated at 524. For example, the vehicle may be configured to output an audible or visible alert responsive to certain vehicle conditions (e.g., low fuel warning, seat belt warning, etc.), driving conditions (e.g., weather information), diagnostic information (e.g., engine or other vehicle system malfunction warnings), scheduled tasks (e.g., scheduled oil change recommendation), etc. The alerts and/or information may be sent to the in-vehicle computing system (e.g., via the CAN bus, a communication link to a mobile device or other external device, etc.) and/or generated by the in-vehicle computing system. Accordingly, the in-vehicle computing system may monitor communication links and/or outputs to the alert/information delivery devices (e.g., speaker system, display, etc.) in order to determine that an alert or other information is to be presented to the driver.

The method 500 includes preventing an increase in cognitive load, as indicated at 526. As indicated at 528, the cognitive load may be maintained by selectively rejecting and/or suppressing driver distractions, such as incoming communications and alerts, based on a rule set stored at the in-vehicle computing system and/or other server (e.g., the mash-up server 202 of FIG. 2). For example, incoming communications may be ranked based on the caller identity, the type of communication, etc., and rejected if the ranking is below an acceptance threshold. In some embodiments, the rule set may include a list of callers that are always accepted, which may be defined by a user and/or based upon a contacts list of a user. In additional or alternative embodiments, the rule set may identify different lists of callers for different cognitive load levels. For example, the rule set may define that a first subset of callers is accepted if the cognitive load is below a first, relatively lower threshold, a second subset of callers is accepted if the cognitive load is below a second, relatively higher threshold, and all other callers are always rejected when the cognitive load is higher than a standard threshold (e.g., the threshold utilized in the determination at 518 in FIG. 5A). In some embodiments, all callers and/or all types of communication may be rejected at 528. It is to be understood that the rule sets described above are exemplary, and any suitable association between communication identifiers and selective acceptance/rejection of the communication may be utilized.

Similar rule sets to those described above with respect to incoming communications may be associated with requests to present information and/or alerts to the driver. For example, alerts may be ranked based upon urgency (e.g., alerts to imminent vehicle failure may be ranked higher, indicating increased urgency, relative to a scheduled alert that can be safely ignored for a period of time), type of alert (e.g., less intrusive alerts may be ranked higher relative to more intrusive alerts), and/or context of alert (e.g., audible alerts may be ranked differently than visual alerts based upon the nature of the cognitive load). As described above, rankings may be associated with different cognitive load thresholds controlling the selective rejection/presentation of the alert. In some embodiments, all alerts may be rejected and/or suppressed at 528.

The rule set governing selective suppression/rejection may also change over time based on observed behaviors, such as a driver immediately calling certain callers back after a call is automatically rejected (resulting in an automatic or requested addition of the caller to the acceptance list), or returning calls even while experiencing higher cognitive loads without affecting detected driving performance (resulting in raising the cognitive load threshold). The rule set may also define conditions and/or contexts under which communications and/or alerts are suppressed (e.g., withheld and presented at a later time) and conditions/contexts under which communications/alerts are rejected (e.g., discarded and not presented unless requested again). In some embodiments, communications and/or alerts may be rejected/suppressed only after confirmation of the rejection/suppression is approved by the driver. While the confirmation may ensure that communications/alerts are not discarded or delayed without driver knowledge, the confirmation may only assist in maintaining a cognitive load when the confirmation is less of a cognitive load than the alert/communication itself.

As indicated at 530, the in-vehicle computing system may assist in actively decreasing the cognitive load of the driver in accordance with a rule set. The cognitive load may be decreased by placing the active phone call on hold, as indicated at 532, reducing a speaker volume, as indicated at 534, and/or by outputting audio alerts to assist the driver in performing a task and/or observing the environment, as indicated at 536. For example, one or more microphones and/or cameras of the vehicle may be utilized to interpret environmental information and present recommendations to the driver in order to decrease the reliance upon the driver to perform such interpretations. An example of this type of assistance is described in more detail below with respect to FIG. 6. It is to be understood that any suitable cognitive load reduction may be performed at 530.

The rule set governing the actions performed to reduce cognitive load may be based on the sources of cognitive load on the driver. For example, if the majority of the cognitive load stems from multiple visual inputs to the driver (e.g., a difficult driving maneuver, heavy vehicular/pedestrian traffic, multiple displayed alerts, etc.), the in-vehicle system may eliminate (permanently or temporarily) one or more visual inputs while keeping all or most audible inputs to the driver in tact. As described above with respect to select rejection/suppression of items, actions taken to decrease cognitive load may be selected based on a ranking of elements that are contributing to the cognitive load of the driver. For example, if the speakers are only presenting music from a radio station, the output of the speakers may be ranked at a lower level of importance than an audible or visual navigational instruction. Accordingly, in such an example, the speaker output may be reduced (e.g., volume lowered) or ceased prior to removing the visual navigational instruction. In some embodiments, the cognitive load may be decreased until it reaches or drops below a cognitive load threshold.

One or more actions to decrease the cognitive load may be performed simultaneously and/or sequentially (e.g., cognitive load may be reevaluated after each sequential action and no further actions are performed after a particular action causes the cognitive load to reach or drop below the threshold). In some embodiments, some or all actions to decrease cognitive load may only be performed responsive to user approval of the particular action. In additional or alternative embodiments, the user may provide a general approval to perform any or all actions to decrease cognitive load, without being informed of the actual action(s) to be performed.

After decreasing the cognitive load at 530, the method 500 proceeds to 566 of FIG. 5A, discussed in more detail below. Returning to FIG. 5A, if the cognitive load is determined to be less than a cognitive load threshold (e.g., "NO" at 518), the method continues to 538 to determine whether the driver is fatigued (e.g., based on the driver state determined at 512). For example, the driver may be determined to be fatigued based on erratic driving behavior (e.g., detecting frequent acceleration changes, via a throttle sensor, not tied to traffic/navigational issues, detecting that the driver drifts outside of the designated lane, via a vehicle-mounted camera, and/or that the driver traverses rumble strips or other safety elements on the road, via the camera and/or an audio sensor, etc.), an amount of time or distance traversed since the last vehicle stop/shut down, detected speech patterns of the driver, time of day, and/or other information received from one or more data sources. In some embodiments, multiple pieces of information from one or more data sources may be utilized together to ascertain the fatigue state of the driver. For example, data from the camera indicating multiple instances of the driver drifting outside of the designated lane (e.g., without subsequently performing a lane change), data from the throttle sensor indicating multiple acceleration change requests, and data from the navigational system/camera indicating traffic and driving conditions that do not necessitate frequent acceleration changes may be received at the in-vehicle computing system and/or a mash-up server to be analyzed in context with one another. Taken alone, each set of data may not result in a determination of driver fatigue, while taken together, the data may result in a determination of driver fatigue.

If the driver is not determined to be fatigued (e.g., "NO" at 538), the method 500 proceeds to 540 to continue monitoring the driver state and returns to 518 to compare the cognitive load to the cognitive load threshold. If the driver is determined to be fatigued (e.g., "YES" at 538), the method 500 proceeds to 542 to engage the driver in conversation, as illustrated in FIG. 5C. Continuing with FIG. 5C, engaging the driver in conversation may include informing the driver of the detected fatigue, as indicated at 544 in order to alert the driver of a potentially dangerous condition. Engaging the driver in conversation may additionally or alternatively include suggesting a driving break, as indicated at 546. The in-vehicle computing system may also identify nearby locations in order to assist the driver in selecting and locating a suitable place for rest, as indicated at 548. The locations may be identified based upon data from multiple sources, such as a navigation system, an internet search tool, user reviews on one or more social networks, etc.

The presentation of the nearby locations to the driver may also be based upon data from multiple sources. For example, the in-vehicle computing device and/or mash-up server may receive information from the sources described above and rank the locations based on the proximity to the vehicle (e.g., closer locations may be ranked higher than those further away), reviews/visitations by the driver and/or friends of the driver (e.g., locations with good reviews or frequent visitation by the driver and/or friends of the driver on one or more social networking sites may be ranked higher than those that have no reviews, which are ranked higher than those with bad reviews), difficulty in reaching the location, and/or other identifying information. Locations with relatively higher rankings may be displayed or otherwise presented more prominently (e.g., first, with a larger/differently colored/styled font, with a special icon, etc.) than those with relatively lower rankings and/or locations with relatively lower rankings may not be displayed or otherwise presented. Information related to the ranking may be displayed or otherwise presented to the driver (e.g., identifying a friend that recommended the location, identifying a distance to the location, etc.) in order to assist the driver in selecting a location.

The method 500 may include creating a fatigue-reduction environment, as indicated at 550. For example, creating a fatigue-reduction environment may include adjusting one or more features of the environment to keep the driver alert or otherwise reduce fatigue-inducing contributors to the environment. Creating a fatigue-reduction environment may include adjusting climate control (e.g., turning on air-conditioning to reduce the temperature of the cabin) as indicated at 552, opening window(s) of the vehicle (e.g., to reduce the temperature of the cabin, introduce fresh air, and increase noise in the cabin) as indicated at 554, and/or adjusting chair position and/or massage settings (e.g., to increase/decrease comfort, place the driver in a more attentive posture, etc.) as indicated at 556. Creating a fatigue-reduction environment may additionally or alternatively include adjusting speaker volume and/or content that is output via the speakers in order to promote wakefulness, as indicated at 558. For example, the radio station and/or audio track played via the speaker may be changed to an upbeat genre of music and/or the speaker volume may be increased in order to prevent the driver from falling asleep.

The method 500 may include transmitting a message(s) to contacts associated with the driver and/or one or more passengers, as indicated at 560. If the driver is traveling in a group with other drivers in other vehicles, the transmitted message(s) may inform the other drivers of the intent to break, as indicated at 562. For example, upon selecting a location, the in-vehicle computing system may automatically transmit a message to the other drivers informing the drivers of the selected break location (e.g., including directions and estimated time of arrival) without the driver requesting such a message. In other embodiments, the in-vehicle computing system may prompt the driver (e.g., request contacts to which the message will be sent, request content for the message, etc.) and/or request permission from the driver before sending the message. Before selecting a break location, the driver may transmit one or more messages to one or more relevant contacts (e.g., selected contacts, members of a traveling group, etc.) to request assistance in selecting a location. The message(s) may include all possible locations and related information (e.g., proximity, reviews, etc.) or may include a subset of the possible locations (e.g., selected by the driver or selected automatically based upon ranking).

As indicated at 564, the transmitted message(s) may include a request for a phone conversation to decrease fatigue and/or select a break location. For example, the driver may be able to stay awake for longer if engaged in a conversation with a friend or family member. As described above, the content of the request may be automatically generated and sent by the in-vehicle computing system, or the driver may have input regarding the content and/or approval to send the message. The request may also include information about the possible break locations so that the contact may assist the driver in selecting a break location. The method 500 may then proceed to 566 of FIG. 5A.

Returning to FIG. 5A, after taking the relevant steps to maintain and/or decrease cognitive load and/or address driver fatigue, the method 500 may include identifying any scheduled events scheduled within a threshold period of time from the current time. The event threshold period of time may vary based upon user selection and/or distance to a target destination of a current navigation session. For example, if a driver is 15 miles away from the destination, the event threshold may be lower than instances in which the driver is 40 miles away from the destination. The scheduled events may be determined based upon information received from one or more calendars associated with one or more user accounts (e.g., personal email, work email, social networking accounts, etc.). The scheduled events may also be determined based upon a proximity to the location of the event. For example, if an event is scheduled to take place in 15 minutes, the driver is 50 miles away from the event location, and the destination of the navigation system used by the driver is 30 miles away from the current driver location (and 40 miles away from the event location), it is unlikely that the driver intends to attend the event. In order to increase accuracy, the in-vehicle computing system may identify all or a subset (e.g., most likely to be attended) of the scheduled events based on the scheduled time of the events and request the driver to select and/or confirm events the driver intends on attending.

As indicated at 568, one or more messages may be sent to social networking profiles and/or contacts of the driver in order to indicate the status of the driver. The message(s) may inform an event attendee of a break location and/or time, as indicated at 570. For example, if the in-vehicle computing system and/or mash-up server receives information related to a scheduled event (e.g., a meeting, dinner, party, social outing, etc.) to which the navigation system is directing the driver, and a break may delay the arrival of the driver to the event, the in-vehicle system and/or mash-up server may request information from one or more social media networks to determine attendees and/or organizers for the event in order to inform the attendees and/or organizers that the driver intends to take a break. As described above, the message(s) may be sent automatically and/or with driver input. An additional message(s) may be sent automatically and/or with driver input once the driver has left the break location. For example, the in-vehicle computing system and/or mash-up server may receive information from the navigational system, an engine sensor, and/or another sensor indicating that the vehicle is powered on and/or is en route to the event location. In response, the in-vehicle computing system may send a message to the event attendees/organizers (e.g., to the same contacts as the previous message) informing the contacts that the driver has resumed travel and/or of an estimated time of arrival. In additional or alternative embodiments, the message(s) may update social networking profile(s) of the driver in order to inform the friends of the driver that the driver is experiencing high cognitive load and cannot be contacted at that time, and/or that the driver is fatigued and would benefit from a lively phone call, assistance in choosing a break location, etc. As described above, the message(s) may not be transmitted unless the driver provides permission and/or content for the message(s) in some embodiments. Although example messages are described above, it is to be understood that any suitable message may be sent to any number or subset of contacts, posted to user profiles/pages for social networking sites, etc.

FIG. 6 shows an example in-vehicle computing system output for maintaining and/or reducing cognitive load of a driver of a vehicle 600. As illustrated, a display 602 of an in-vehicle computing system 604 may provide navigational instructions to a driver 605. As shown, the navigational instructions displayed on display 602 may provide assistance to the driver for performing a complex driving maneuver, such as traversing a route having frequent merging sections, lane changes, and/or turns, traversing an intersection with multiple lanes and/or heavy traffic, etc. Additionally, the presence of the pedestrian 606 crossing in front of the vehicle may contribute to the cognitive load of the driver, as the driver will perceive the pedestrian and adjust vehicle operation (e.g., slow down the vehicle, steer away from the location of the pedestrian, engage an audible vehicle horn to alert the pedestrian to the presence of the vehicle, etc.) in order to ensure the safety of the pedestrian. The complexity of the navigational instructions and associated driving maneuvers in combination with the pedestrian as depicted in FIG. 6 may cause the determined cognitive load on the driver to exceed a cognitive load threshold. For example, the in-vehicle computing system 604 and/or a server in communication with the in-vehicle computing system 604 (e.g., mash-up server 202 of FIG. 2) may receive/generate the navigational instructions and analyze the complexity associated with the instructions. Utilizing information regarding other features of the environment of the driver/vehicle (e.g., based on data from vehicle sensors, such as a camera imaging the pedestrian, and/or other external information sources), the cognitive load may be determined and compared to a threshold.

Upon determining that the cognitive load is above a threshold, the in-vehicle computing system may perform one or more actions to ensure that cognitive load does not increase (e.g., to at least maintain a cognitive load). As shown on the example display 602 of the in-vehicle computing system, a notification is presented informing the driver that an incoming phone call was automatically declined. For example, the phone call may have arrived after a time at which the cognitive load of the driver was determined to be above a threshold. As the phone call may increase the cognitive load on the driver even further, the in-vehicle computing system may automatically decline the phone call (e.g., direct the caller to the voicemail of the driver without allowing the phone to "ring"). In some embodiments, the notification of the declined phone call may not appear while the cognitive load is above a threshold in order to remove the distraction of the notification. For example, any notifications of declined communications, suppressed alerts, etc. may be stored and presented sequentially, simultaneously, as a navigable list, and/or in any other suitable format upon determination that the cognitive load has dropped below the threshold. In additional or alternative embodiments, each stored notifications may be displayed when the cognitive load is low enough to accommodate the additional cognitive load associated with the notification without surpassing the threshold. In this way, if the cognitive load of the driver is below a threshold and the presentation of the notification would cause the cognitive load of the driver to exceed the threshold, the notification may not be presented.

The in-vehicle computing system 604 may additionally or alternatively perform one or more actions to reduce a cognitive load on the driver. For example, an audible alert 608 may be presented via one or more speakers 610 of the vehicle in order to alert the driver to the presence of the pedestrian 606 and/or instruct the driver on ways to avoid the pedestrian. For example, image data from a camera of the vehicle (e.g., the camera(s) in sensor subsystem 310 of FIG. 3) may be analyzed by the in-vehicle computing system 604 and/or a server (e.g., mash-up server 202 of FIG. 2) and the presence/direction of travel of the pedestrian may be determined based on the image data. Responsive to the detection of the pedestrian, the audible alert 608 may be generated. The audible alert 608 may include any suitable alert, such as a particular pattern of noises (e.g., beeps, tones, etc.) configured to capture or direct the attention of the driver to the road and/or a spoken message (e.g., in a language selected based on user preferences associated with the in-vehicle computing system 604 and/or other user account) informing the driver that a pedestrian has been detected and/or instructing the driver to complete vehicular maneuvers to avoid the pedestrian (e.g., based on the determined direction of travel of the pedestrian, the audible alert may direct the driver to brake and/or steer in an opposite direction to the direction of travel of the pedestrian).

The audible alert may decrease the cognitive load on the driver by assisting with observational duties and determining responses to such observations. The audible alert may also increase safety of the driver and pedestrian by providing an early warning system when the driver may temporarily divert attention away from particular areas around the vehicle (e.g., the driver may be looking down at the display 602 more frequently during a complex maneuver or out a side window when turning).

Figure 7:
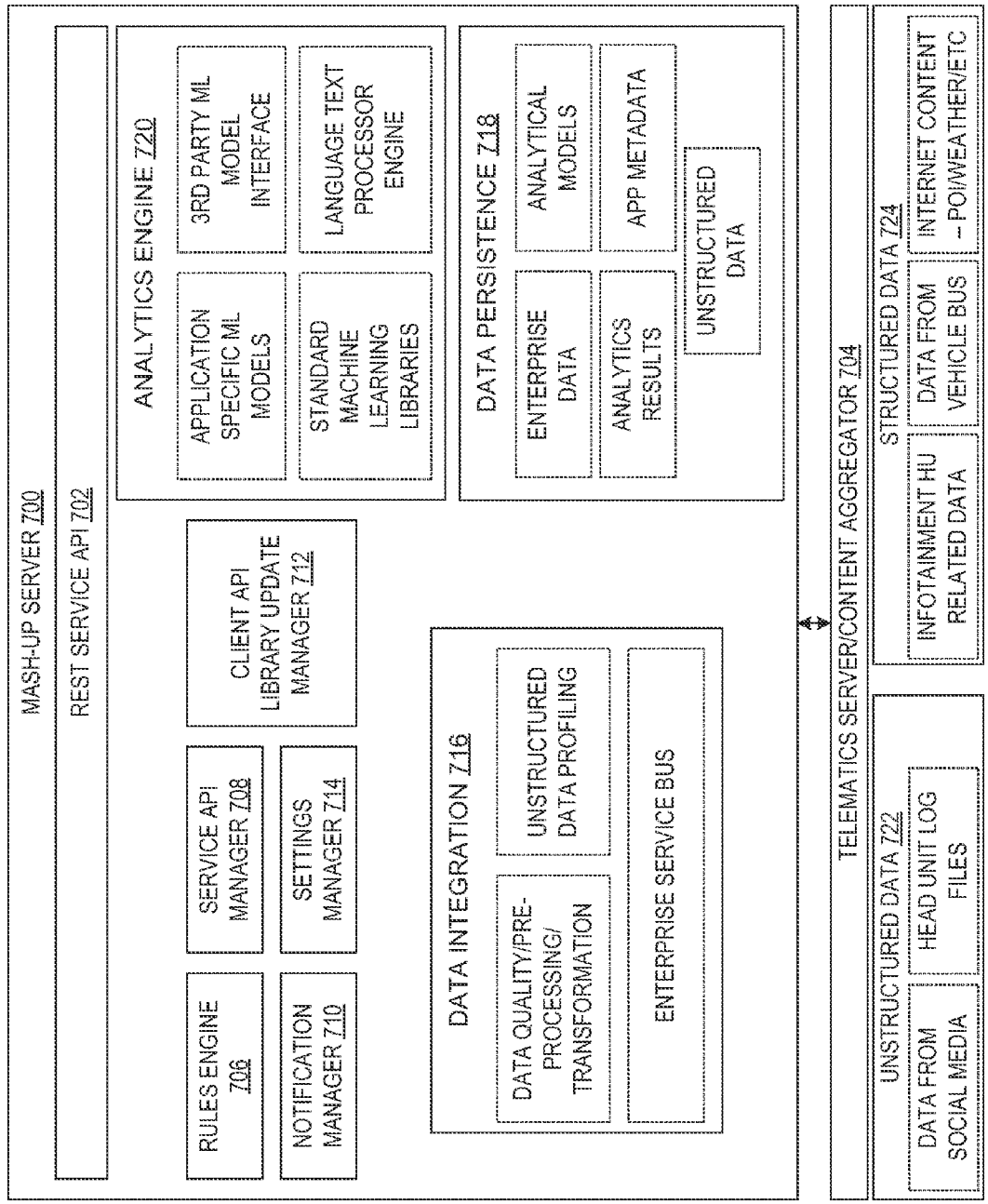
FIG. 7 shows a block diagram of a mash-up server, in accordance with one or more embodiments of the present disclosure.

FIG. 7 shows a block diagram of a mash-up server 700 for providing context-specific instructions to an in-vehicle computing system (e.g., in-vehicle computing system 109 of FIGS. 1 and 2) in accordance with one or more embodiments of the disclosure. For example, mash-up server 700 may be an example of mash-up server 202 of FIG. 2. The mash-up server 700 may include an API, such as a REST service API 702, to define the roles and interactions of the components of the mash-up server and provide an accessible interface to allow the components to be accessed by clients of the server (e.g., external devices communicatively connected to the server, such as a telematics server/content aggregator 704).

The mash-up server 700 may include a rules engine 706 for invoking rules based on the occurrence of one or more events. The rules define action(s) to be taken for an event and results to be presented to a driver of a vehicle (e.g., a user of the in-vehicle computing system). Actions may include gathering of data from multiple third party contents (e.g., via a content aggregator) and other sources of information (e.g., vehicle sensors, driver behavior, etc.) and mixing this data intelligently based on the vehicle and/or driver context. Rules may be created by a rule set provider via a rule creator/mash-up tool (e.g., including a graphical user interface for building relationships between contextual data, events, and actions).

Rule set providers may optionally expose commonly used rules (e.g., guidance when fuel in the vehicle is low) as service APIs that are accessible by other applications and/or devices. The mash-up server 700 may include a service API manager 708 to manage the interfacing with devices/applications calling such commonly used rules and associated service APIs (e.g., the in-vehicle computing system or other application in the mash-up server) and provide the results of the rules.

The mash-up server 700 may include a notification manager 710 to manage device (e.g., in-vehicle computing system, smart phone, etc.) identifiers for sending push notifications or other alerts. The notification manager 710 may interact with the rules engine 706 to trigger notifications based on pre-configured rules. For example, in response to a detection that a friend of the driver is within a threshold distance of the vehicle, a rule may define a notification to be sent to the driver. Accordingly, the notification manager may identify the device to which the notification is to be sent (e.g., locate a device identifier for an in-vehicle computing system) and control the transmission of the notification to that device.

One or more elements of the mash-up server 700 may be periodically updated to expand functionality, address recurring issues (e.g., correct malfunctions), etc. A client API library update manager 712 may be responsible for informing a telematics server or other device/application (e.g., telematics server/content aggregator 704) about the availability of a new client API library for a specific vehicle make, model, year, geography, etc. The telematics server or other device application may notify all vehicles (e.g., via the in-vehicle computing system) associated with the update that the update is available. Upon receiving the notification, the in-vehicle computing system of each vehicle may download the update using the client API download service via the telematics server. Although the client associated with the API library is described above as corresponding to the in-vehicle computing system, it is to be understood that the API library and associated updates may correspond to any suitable client, such as a mobile computing device (e.g., a smart phone associated with the driver or a passenger of the vehicle).

One or more user settings (e.g., associated with a driver or other user of the vehicle), vehicle settings, etc., may be stored and/or accessed by a settings manager 714. The settings may be stored in a centralized database included in or otherwise in communication with the settings manager 714 so that all subsystems of the mash-up server 700, as well as other devices in communication with the mash-up server 700, may access the settings. For example, user settings may include user personalized data/settings, personal information, etc. stored as an ID-value pair. The user settings may be input by the user (e.g., via a graphical user interface and/or voice command interface of the in-vehicle computing system) or automatically imported from another user account (e.g., a social networking account for the driver).

The mash-up server 700 may include one or more subsystems, such as the data integration subsystem 716, the data persistence subsystem 718, and the analytics engine subsystem 720. The data integration subsystem 716 may be responsible for receiving and collating/gathering data from different systems (e.g., internal and/or external to the mash-up server 700) and transforming the data to a format that is compatible with applications used by the mash-up server. For example, for unstructured data 722 (e.g., data from social media services, click stream data, and/or other data that is received without structure defining the context or relationships between the data), the data integration subsystem 716 may search for relationships between the data elements and transform the data to a structured/semi-structured format (e.g., a format associated with structured data 724) for further processing. The data integration subsystem 716 may include and/or be connected to a communications interface of the mash-up server 700 in order to communicate with the different systems. The data persistence subsystem 718 may be responsible for storage, retrieval, and management of data required by one or more applications running on the mash-up server 700.

The analytics engine subsystem 720 may include standard machine learning libraries, which may be a combination of open source and proprietary/customized libraries that implement standard machine learning algorithms. For example, the machine learning libraries may support algorithms such as k-means clustering, mean shift clustering, singular value decomposition, user and item-based recommendation engines, etc. The analytics engine subsystem 720 may include application specific machine learning models that include a set of library functions that model data such as the behavior of a driver/passenger/vehicle based on data received over a period of time. The application specific machine learning models support rules that incorporate driver behavior, preferences, moods, etc.

The analytics engine subsystem 720 may include a natural language text processor that includes a set of library functions for analyzing text data of one or more languages. For example, the natural language text processor may include functions for sentence breaking, parse tree generation, part of speech tagging, topic segmentation, and/or other speech recognition techniques. The natural language text processor assists with building models for sentiment analysis and other language-based rules. The analytics engine subsystem 720 may include a $3^{rd}$ party machine learning (ML) model/service interface to provide an abstract interface to $3^{rd}$ party services that provide specialized models for a given machine learning problem. The $3^{rd}$ party ML model/service interface enables APIs for such $3^{rd}$ party models and services to be accessed and utilized by the mash-up server 700 in order to increase the amount and types of processing provided by the mash-up server 700. The results of the analysis performed by the analytics engine subsystem 720 may be stored at the data persistence subsystem 718 and accessed by the rules engine 706, the service API manager 708, the notification manager 710, and/or any other subsystem of the mash-up server 700 or external server (e.g., via a communications interface of the mash-up server 700).

By leveraging real-time contextual data during in-vehicle computing system operation, an in-vehicle computing system in communication with a mash-up server may provide a user experience that adapts to dynamic behavior, environmental, and operational changes while adhering to predefined rules. Adjusting in-vehicle computing system behavior responsive to a context of the vehicle/driver that is derived from a plurality of information sources enables the in-vehicle computing system to provide more autonomous and accurate operation than in-vehicle computing systems that rely primarily on user input and a more limited amount of data gathering.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or mash-up server 202 described with reference to FIGS. 1 and 3. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system for a vehicle, comprising:
   a processor;
   an external device interface communicatively coupleable to an extra-vehicle server; and
   a non-transitory storage device storing instructions executable by the processor to:
   receive information from a navigation subsystem and one or more sensors of the vehicle, the information including user information identifying one or more occupants of the vehicle with one or more accounts of a social media network;
   send the received information to the server;
   receive instructions from the server, the instructions identifying an action to be performed based on the received information, the action being identified based on a context of the one or more occupants derived from social networking information received at the server from the social media network; and
   transmit control instructions to one or more vehicle systems based on the identified action.

2. The in-vehicle computing system of claim 1, wherein the action comprises a command to control operation of the vehicle based at least on the context of the one or more occupants derived from the social networking information received at the server from the social media network, and the one or more vehicle systems includes a vehicle controller in communication with the in-vehicle computing system via a Controller Area Network (CAN) bus.

3. The in-vehicle computing system of claim 1, further comprising a display device, and wherein the action comprises a command to output a visual alert to the display device.

4. The in-vehicle computing system of claim 1, wherein the action comprises a command to output an audible alert to a speaker system of the vehicle.

5. The in-vehicle computing system of claim 1, wherein the external device interface communicatively connects the in-vehicle computing system to an external mobile device, and wherein the action comprises a command to transmit a message to the external mobile device.

6. A system for controlling an output of an in-vehicle computing system of a vehicle, the system comprising:
   a data integration subsystem that receives data from the in-vehicle computing system and a content aggregator;
   an analytics engine that analyzes the received data;
   a data persistence subsystem that manages analytics results from the analytics engine;
   a rules engine that invokes rules responsive to an occurrence of one or more events based on analysis of the received data by the analytics engine, the rules defining an instruction to control the output of the in-vehicle computing system, the instruction being identified based on a context of one or more occupants derived from social networking information received at a server from a social media network; and a service application programming interface (API) that transmits, to the in-vehicle computing system, an indication of an action to be performed by the in-vehicle computing system.

7. The system of claim 6, further comprising a notification manager that triggers notifications to the in-vehicle computing system based on rules provided by the rules engine.

8. The system of claim 6, wherein the content aggregator aggregates social networking data from one or more social media networks corresponding to a user account associated with a driver of the vehicle.

9. The system of claim 6, wherein the analytics engine includes one or more machine learning models and libraries that model behavior of a driver of the vehicle and the vehicle based on data received from the in-vehicle computing system over a period of time.

10. The system of claim 6, wherein the analytics engine includes a language processor engine that interprets speech input received at the in-vehicle computing system and transmitted to the data integration subsystem.

11. A method for controlling an output of an in-vehicle computing system of a vehicle, the method comprising:
receiving, at a server, navigational information from a navigation system of the vehicle;
receiving, at the server, aggregated social networking information from one or more user accounts of one or more social networking sites associated with a driver of the vehicle;
determining a cognitive load of the driver of the vehicle based on the navigational information and the aggregated social networking information, the aggregated social networking information including one or more of a social networking profile and social networking feed data of the one or more user accounts;
responsive to determining that the cognitive load of the driver is above a threshold, transmitting an instruction to the in-vehicle computing system to prevent an increase in cognitive load and/or decrease a cognitive load on the driver in accordance with a rule set, the instruction being identified based on a context of the one or more occupants derived from the aggregated social networking information.

12. The method of claim 11, wherein the information from the navigation system comprises one or more of road conditions, traffic conditions, route complexity, and a travel time elapsed since a last vehicle shut down, and wherein the instruction comprises a command to control operation of the vehicle based at least on the context of the one or more occupants derived from the aggregated social networking information.

13. The method of claim 11, wherein transmitting the instruction to the in-vehicle computing system to prevent the increase in cognitive load and/or decrease the cognitive load on the driver comprises preventing the increase in cognitive load by selectively rejecting or suppressing incoming communications or alerts based on the rule set.

14. The method of claim 11, wherein transmitting the instruction to the in-vehicle computing system to prevent the increase in cognitive load and/or decrease the cognitive load on the driver comprises decreasing the cognitive load by placing an active phone call on hold or terminating the active phone call.

15. The method of claim 11, wherein transmitting the instruction to the in-vehicle computing system to prevent the increase in cognitive load and/or decrease the cognitive load on the driver comprises decreasing the cognitive load by reducing a volume of one or more speakers in the vehicle.

16. The method of claim 11, wherein transmitting the instruction to the in-vehicle computing system to prevent the increase in cognitive load and/or decrease the cognitive load on the driver comprises decreasing the cognitive load by outputting one or more audible alerts based on image data received from a camera of the vehicle or the navigational information.

17. The method of claim 11, further comprising determining whether the driver is fatigued based on the navigational information, data from wearable sensors and the aggregated social networking information.

18. The method of claim 17, further comprising, responsive to determining that the driver is fatigued, presenting an alert to the driver suggesting a driving break and identifying nearby break locations, the nearby break locations being identified based on reviews or visitation data on the one or more social networking sites.

19. The method of claim 17, further comprising, responsive to determining that the driver is fatigued, adjusting one or more vehicle systems to create a fatigue-reduction environment within the vehicle.

* * * * *